UNITED STATES PATENT OFFICE.

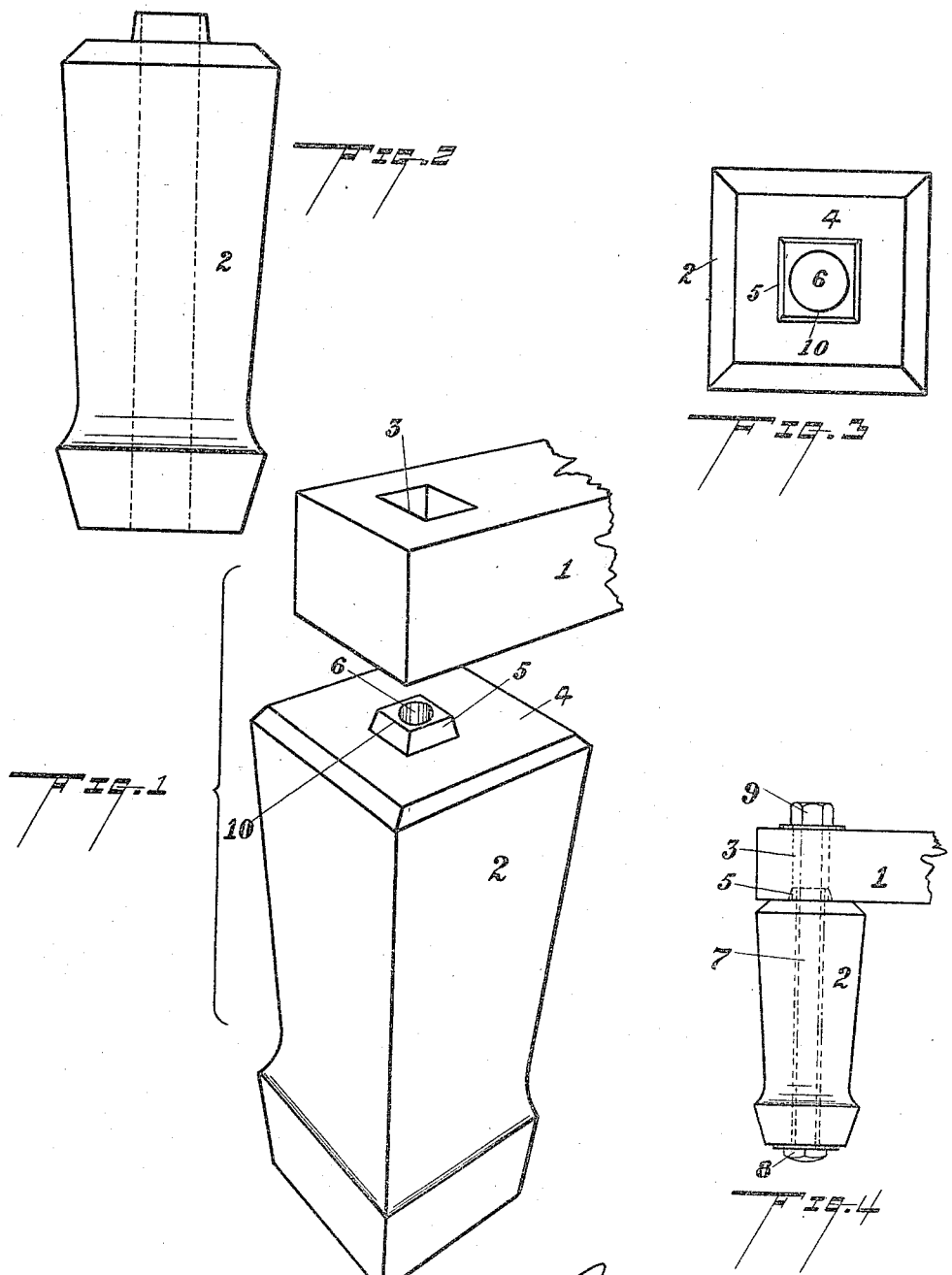

JOHN HERZOG, OF SAGINAW, MICHIGAN.

JOINT FOR FURNITURE.

1,282,830.   Specification of Letters Patent.   Patented Oct. 29, 1918.

Application filed April 4, 1916. Serial No. 88,934.

*To all whom it may concern:*

Be it known that I, JOHN HERZOG, a citizen of the United States, residing at Saginaw, in the county of Saginaw and State of Michigan, have invented certain new and useful Improvements in Joints for Furniture; and I do hereby declare the following to be a full, clear, and exact description of the invention, such as will enable others skilled in the art to which it appertains to make and use the same.

This invention relates to furniture joints and pertains more particularly to an improved joint for use in assembling knock-down furniture.

The objects of my invention are to provide a joint by which two members of a piece of furniture, such as the leg and top of a table, piano bench, or other article of furniture, may be easily and quickly assembled or taken apart by persons unskilled in the manufacture of furniture.

A further object is to provide in such a furniture joint means whereby the assembled parts will be securely held together and prevented from becoming loose, even though shrinkage or warping of the parts takes place after the parts are assembled.

A further object is to provide a joint that will enable one of the assembled members, as the leg of a table, to be taken off and another member of different pattern substituted, in order to produce an article of furniture of different appearance and design.

A still further object is to provide a joint that will not only hold the assembled parts securely together, but will also prevent their accidental displacement. For example, my improved joint prevents the leg of a table from being accidentally twisted or turned out of its correct position with relation to the body of the table.

Another object is to provide a joint that will enable one of the parts, as the leg, to be placed with any one of its faces outward, so that if one face becomes marred the part may be taken off and replaced with one of its other faces outward, thereby concealing the marred face from view.

With these and certain other objects in view, which will appear later in the specification, my invention comprises the devices described and claimed and the equivalents thereof.

In the drawings, Figure 1 is a perspective view of a horizontal stretcher of a table or other article of furniture, and a leg or pedestal therefor in position about to be assembled.

Fig. 2 is a side view of the leg.
Fig. 3 is a top view of the leg.
Fig. 4 is a side view of the parts assembled.

As is clearly shown in the drawings, 1 represents a stretcher and 2 is a leg or similar part to be secured to the stretcher, in assembling the completed article.

The stretcher is formed with a transverse hole or mortise 3 of rectangular, preferably square, cross section, and one end of the leg 2 is formed with a flat upper surface 4 and an upwardly projecting tenon 5, the sides of which are preferably slightly beveled, thereby forming a slightly tapering tenon smaller at the top than at its base.

The leg 2 is bored lengthwise, the hole 6 thus formed extending centrally through the tenon, as shown in Figs. 1 and 3.

The upper end of the tenon is small enough to be easily received in the rectangular opening 3 of the member 1, and its lower end is sufficiently large to be received in the opening 3 only by being forcibly pressed or clamped to the member 1. The clamping device consists in a bolt 7 having a head 8 at one end and a nut 9, or equivalent, at the other, by which the members 1 and 2 may be forcibly drawn together until the face 4 of member 2 is drawn tightly against the face of member 1.

The hole 6 is preferably almost equal in diameter to the width of tenon 5, thereby leaving only a thin wall, as 10, at the sides of the tenon. This thin wall 10 is capable of yielding slightly when the tenon is forced into the opening 3 and insures a firm, but slightly resilient grip between the tenon and the walls of the opening 3.

By the means above described, I have produced a joint for furniture that enables the parts to be easily and quickly assembled. The faces of the joined members are held in intimate contact and rigidity is thereby secured. The rectangular tapered tenon properly centers the pieces, prevents twisting and tightly holds the parts, while permitting them to be disassembled and re-assembled, or new parts to be substituted, without the use of skilled labor.

Having thus described my invention, what

I claim and desire to secure by Letters Patent is:

In a furniture joint, the combination of a member formed with a mortise of rectangular cross section, a second member having at one end a projecting tenon of rectangular section, the side walls of said tenon tapered, said second member and said tenon formed with a longitudinal hole therethrough, of slightly less diameter than the width of said tenon to form a wall of less thickness at the sides than at the corners of said tenon, a tie bolt extending through said hole and said first member, and adapted to force said tapered tenon into said mortise.

In testimony whereof, I affix my signature in presence of two witnesses.

JOHN HERZOG.

Witnesses:
THEODORE F. GAENSBAUER,
ROY WALLIS.

Copies of this patent may be obtained for five cents each, by addressing the "Commissioner of Patents, Washington, D. C."